J. A. HARRIS, Jr.
AUTOMOBILE FENDER OR LIFE GUARD.
APPLICATION FILED MAY 12, 1908.

927,530.

Patented July 13, 1909.
2 SHEETS—SHEET 1.

WITNESSES

INVENTOR
JOHN A. HARRIS JR.
BY Paul & Paul
HIS ATTORNEYS

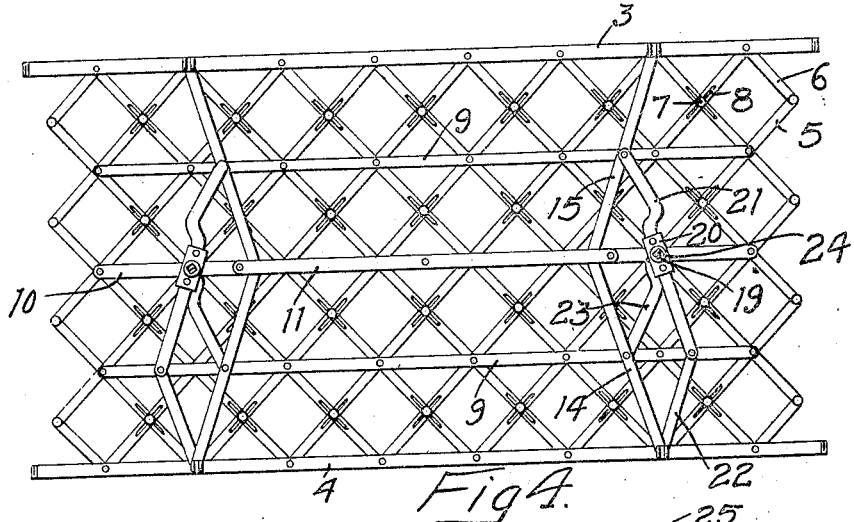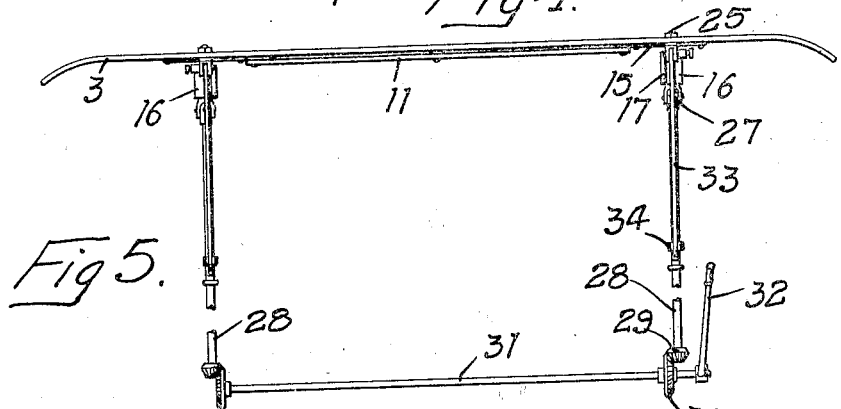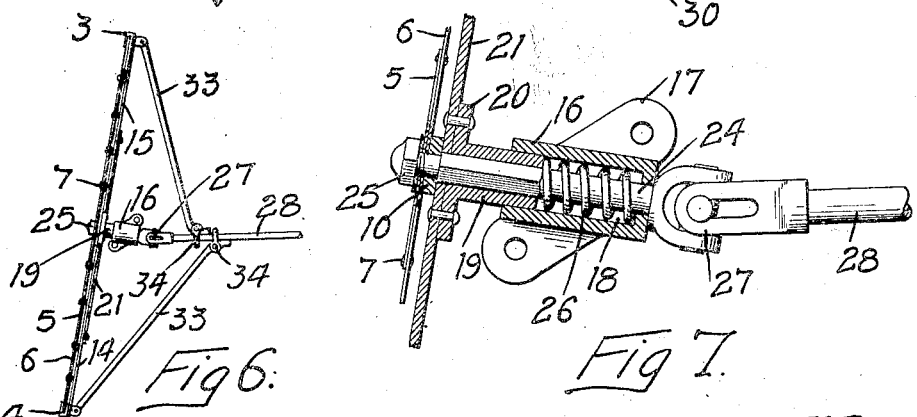

UNITED STATES PATENT OFFICE.

JOHN A. HARRIS, JR., OF MINNEAPOLIS, MINNESOTA.

AUTOMOBILE FENDER OR LIFE-GUARD.

No. 927,580.

Specification of Letters Patent.

Patented July 13, 1909.

Application filed May 12, 1908. Serial No. 432,381.

*To all whom it may concern:*

Be it known that I, JOHN A. HARRIS, Jr., of Minneapolis, Hennepin county, Minnesota, have invented certain new and useful Improvements in Automobile Fenders or Life-Guards, of which the following is a specification.

The object of my invention is to provide a collapsible fender capable of ready application to any size and type of automobile.

A further object is to provide a fender which will positively prevent any person or object struck by the machine from being thrown under the wheels.

A further object is to provide a fender which will not in any way interfere with access to the lamps or the mechanism on the forward portion of the machine.

The invention consists generally in various constructions and combinations, all as hereinafter described and particularly pointed out in the claims.

Figure 1:
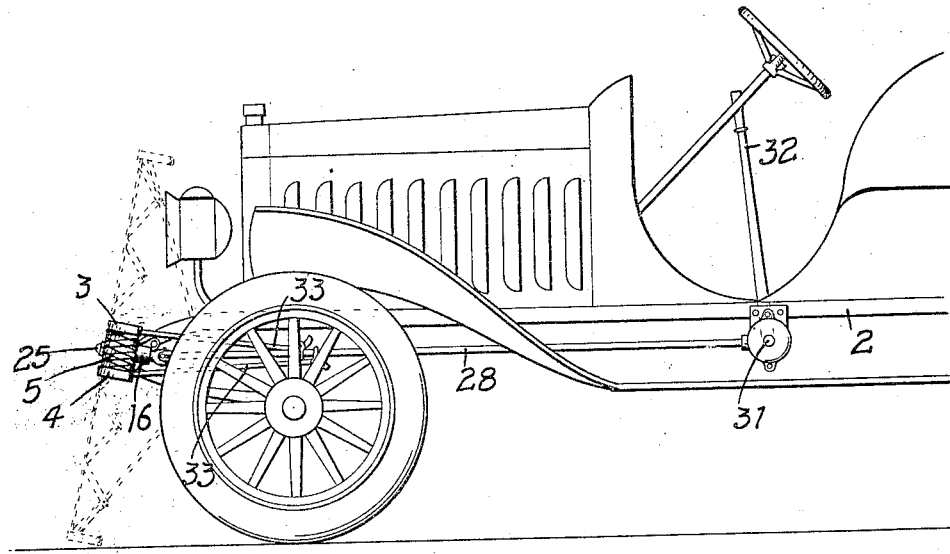
Figure 2:
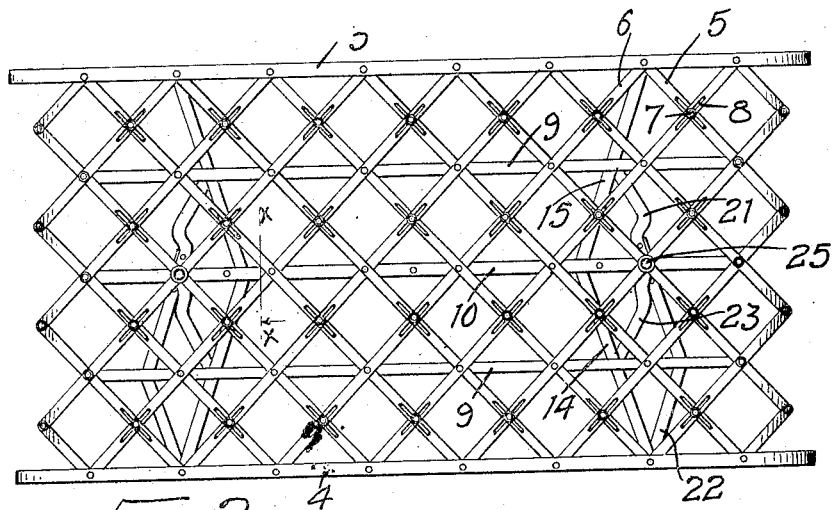
Figure 3:
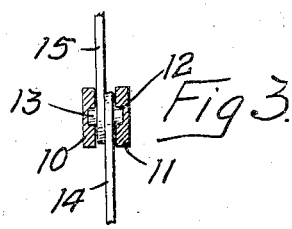

In the accompanying drawings, forming part of this specification, Figure 1 is a side elevation of the forward portion of an automobile with my invention applied thereto. Fig. 2 is a front view of the fender removed from the machine. Fig. 3 is a detail sectional view on the line x—x of Fig. 2. Fig. 4 is a rear view of the fender, taken on a section line through the supporting shafts. Fig. 5 is a top view. Fig. 6 is an end view illustrating the mechanism for operating the fender. Fig. 7 is a detail sectional view showing a means whereby the fender is adapted to yield when struck by an object in front of the car.

In the drawing, 2 represents an automobile frame having a portion projecting in front of the wheels and whereon the fender is supported.

3 and 4 represent the top and bottom rails of the fender projecting laterally in front of the wheels and backwardly turned at the ends, as indicated in Fig. 5 to form a guard or shield between the wheels and the person or object in front of them. The rails 3 and 4 are connected with one another by a series of diagonally arranged bars 5 and 6 forming a metallic lattice work, the ends of the bars being pivotally connected to the rails 3 and 4 and to one another. At their points of intersection the bars are connected by pins 7 passing through slots 8 in said bars which permit the folding of the fender and the movement of the rails 3 and 4 toward one another without increasing the length of the fender. Braces 9 are provided upon each side of the middle line of the fender and are secured to the bars at their points of intersection. A middle rail 10 is provided intermediate of the braces 9 and a bar 11 is secured to the rail 10, and said rail and bar are provided with grooves 12 extending lengthwise therein and adapted to receive lugs 13 on levers 14 and 15 which are pivoted to the rails 3 and 4.

When the ends of the levers 14 and 15 are moved toward one another their lugs sliding in the slots 12, the rails 3 and 4 will be drawn together and the lattice work filler between them will be collapsed to permit folding of the fender. To unfold the fender the levers 14 and 15 are moved outwardly thereby forcing the rails 3 and 4 apart and expanding the metallic filler between them. To open and close the fender from the car I provide a mechanism within convenient reach of the driver which I will now describe in detail.

16, 16 represent castings having flanges 17 for securing them to the forward portion of the machine frame and provided with sockets 18 to receive hubs 19. These hubs have flanges 20 to which bars 21 are secured, one end of said bars being pivotally connected with the levers 15 and the other ends of said bars being pivotally connected with the lower rail 4 through links 22. Links 23 are also provided connecting the hubs 19 with the levers 14. Within the hubs 19 spindles 24 are arranged having squared portions within said hubs and carrying nuts 25 by which the outer ends of the spindles are secured to the metallic filler. The hubs are arranged to slide in the sockets 18, and springs 26 are arranged in said sockets and adapted to resist the inward movement of the hubs therein. The rear ends of the spindles 24 have universal joint connections 27 with the slotted forward ends of shafts 28 which extend backwardly toward the middle of the machine and have pinions 29 meshing with gears 30 on a transverse shaft 31. A lever 32 is mounted on said shaft within convenient reach of the driver and by moving said lever back and forth the shaft 31 will be revolved and its movement transmitted through the shafts 28 to the fender to fold or unfold the same. The upper and lower rails are provided with braces 33 pivotally connected thereto and having sliding connections 34 with the shafts 28. The fender may be locked in its expanded position by means of these braces.

In use the fender will be supported on the front of the automobile, substantially as illustrated in Fig. 1, the upper portion being inclined backwardly when unfolded and the lower portion projecting forward so that it will first come in contact with the person or object struck by the car.

The fender may be made in various sizes and widths according to the car upon which it is to be used.

I claim as my invention:

1. The combination, with a car frame, of a vertically collapsible fender having end portions projecting laterally in front of the wheels and capable of movement toward or from each other, to fold or expand the fender, and means within control of the driver of the car for folding or unfolding said fender.

2. The combination, with an automobile frame, of a collapsible fender mounted thereon and arranged to fold and unfold in a substantially vertical plane, shafts projecting forwardly on said frame, means operatively connecting said shafts and said fender for folding and unfolding said fender, and an operating lever within reach of the driver of the car connected with said shafts, for the purpose specified.

3. A folding fender comprising upper and lower horizontal rails and a metallic lattice work filler between said rails, the bars of said filler having sliding pivotal connections with one another at their points of intersection, and mechanism for drawing said rails together or separating them, substantially as described.

4. The combination, with an automobile frame, of a folding fender comprising upper and lower horizontal rails, a metallic lattice work filler interposed between said rails and attached thereto, the bars composing said filler having sliding pivotal connections with one another at their points of intersection, levers attached to said rails and having intermediate pivotal connections with one another, and mechanism within convenient reach of the driver of the car for oscillating said levers to fold or unfold the fender.

5. A folding fender comprising upper and lower rails and a metallic lattice work filler connecting them, the bars composing said lattice work having longitudinal slots therein at their points of intersection with one another, and pivot pins passing through said slots, whereby said fender can be folded or unfolded without changing the length thereof, shafts mounted in said frame, an operating lever therefor within convenient reach of the driver, and operative connections provided between said shafts and said fender.

6. The combination, with an automobile frame, of a folding fender comprising top and bottom rails and an intermediate lattice work filler, shafts mounted in said frame, an operating lever therefor, castings secured to said frame having sockets therein, spindles fitting within said sockets, and having universal joint connections with said shafts, and hubs mounted on said spindles, and operatively connected with said rails to open and close said fender, substantially as described.

7. The combination, with an automobile frame, of a collapsible fender comprising top and bottom rails and an intermediate filler, levers connected with said rails, a middle rail, a bar secured thereto, said middle rail and said bar having longitudinal grooves therein to receive lugs on said levers, and mechanism for oscillating said levers to draw said top and bottom rails together or separate them.

8. The combination, with an automobile frame, of a collapsible fender, supports mounted on said frame and having sockets therein, spindles fitting within said sockets, hubs carried by said spindles, springs provided within said sockets and yieldingly resisting backward movement of said hubs therein, means connecting said hubs with said fender and means for revolving said spindles to open and close said fender.

9. The combination, with an automobile frame, of supports mounted thereon having sockets therein, spindles fitting within said sockets and slidable therein, springs yieldingly resisting backward movement of said spindles, a collapsible fender having operative connections with said spindles, shafts mounted in said frame and having slidable connections with said spindles, and means for revolving said shafts to open or close said fender.

10. The combination, with an automobile frame, of a fender comprising a metallic lattice work supported in a substantially vertical plane on said frame and comprising upper and lower portions that are adapted to move vertically toward or from one another in said plane to assume a closed or open position, and mechanism operatively connected with said lattice work for expanding or collapsing the same, substantially as described.

11. The combination, with an automobile frame, of a fender or life guard having upper and lower portions capable of expanding or collapsing from or toward one another within a substantially vertical plane, and means within control of the driver of the machine for opening and closing said fender.

12. The combination, with a car frame, of a fender or life guard mounted thereon, such guard having its middle portion attached to said frame and comprising upper and lower portions, which are capable of vertical movement with respect to said middle portion to allow the expansion or collapse of the fender.

13. The combination, with a car frame, of a collapsible fender, having means for connecting its middle portion to said frame, said fender being normally out of contact with the ground but capable of expanding vertically to form a guard in front of the wheels, substantially as described.

In witness whereof, I have hereunto set my hand this 9th day of May 1908.

JOHN A. HARRIS, Jr.

Witnesses:
    J. H. BALDWIN,
    RICHARD PAUL.